Feb. 24, 1970  C. L. TELK ET AL  3,497,828

ELECTRO-OPTIC Q-SWITCH

Filed Dec. 6, 1967

INVENTORS
CHARLES L. TELK
GARY D. TOMPKINS
BY

ATTORNEY 3,497,828
ELECTRO-OPTIC Q-SWITCH
Charles L. Telk, Orange, and Gary D. Tompkins,
Cypress, Calif., assignors to North American
Rockwell Corporation
Filed Dec. 6, 1967, Ser. No. 688,442
Int. Cl. H01s 3/11; G02f 1/26; G02b 1/24
U.S. Cl. 331—94.5
16 Claims

ABSTRACT OF THE DISCLOSURE

An electro-optic Q-switch for a pulsed laser which uses a single crystal of lithium niobate operating in the dual transverse Pockels mode. The direction of light propagation is along the crystal's optic axis and the electric field is applied along the crystal's A-axis.

BACKGROUND OF THE INVENTION

Field of the invention

The present invention relates to an electro-optic Q-switch for a pulsed laser and, more particularly, to a Q-switch utilizing a single crystal of lithium niobate operating in the dual transverse Pockels mode.

Description of the prior art

Ever since the invention of the laser, many practical uses have been proposed therefor based upon its inherent property of producing a highly collimated beam of light. For example, this property makes the laser extremely valuable in communication systems, in radar systems, as a weapon and, more recently, in medicine. When used in radar or other types of ranging systems, the laser is generally operated in a pulsed mode. Such a mode is preferred because of the ability of the laser to provide accurate range and direction information by transmitting a narrow pulse of light and noting the direction and time of arrival of the pulse reflected from the target.

A typical pulsed laser consists of a lasing element, an excitation source, and a pair of reflectors which form the laser cavity, one of the reflectors being partially reflecting to provide the output beam. To operate the laser, the excitation source is pulsed and the lasing element begins to oscillate. If no other apparatus is added to the laser cavity, the laser will generate a high energy pulse of light which may be spread out over a period as high as 200 microseconds. In fact, in the case of a ruby laser, the pulse may be in the millisecond region. Although such a pulse is satisfactory for many applications, in most cases it is not. In order to determine range with a high degree of accuracy, it is necessary that the pulse be as narrow as possible. In addition, since the range of the system is a function of the peak amplitude of the pulse, it is desirable to narrow the pulse to a considerable degree in order to increase the energy per unit of time.

The most common technique for decreasing the pulse width is based on the fact that the ability of the laser cavity to oscillate is dependent upon the alignment of all the optical surfaces, i.e. the reflectors and the front and rear surfaces of the lasing element. Since all these surfaces have to be very carefully aligned in order for the laser to oscillate, the alignment of the rear reflector may be manipulated to control oscillation. What is done is that the rear reflector is badly misaligned, lowering the Q of the cavity so that it will not oscillate. The excitation source is then flashed and a finite period of time allowed to lapse whereupon the lasing element reaches the metastable state at which time the lasing element has stored therein the maximum amount of energy. At this point in time, the rear reflector is swung back into alignment with the remainder of the optical surfaces in the cavity, whereupon the Q becomes very high. Since the lasing element now sees a cavity of high Q, it begins to oscillate and discharges its energy in a short period of time, i.e. on the order of 100 nanoseconds.

Such a Q-switch is generally mechanized by mounting the rear reflector on a motor and driving the motor at a constant velocity. Electronic circuitry is then required to sense the position of the motor and to trigger the flashlamp at a time such that when the mirror reaches the aligned position, the lasing element is in the metastable state.

Although operative, such a Q-switch is inherently too slow to provide pulses with a width less than approximately 100 nanoseconds. In addition, such a Q-switch does not have a well-defined high Q-position, making it difficult to accurately determine when oscillation is initiated. This is because it is extremely difficult to determine exactly what Q is required to start oscillations. As a result, most Q-switches made in this manner generally provide either a relatively broad pulse, on the order of 100 nanoseconds, or multiple pulses, both of which are highly undesirable in radar type systems. Finally, since speeds of operation of as high as 24,000 r.p.m. are usually required, the apparatus is very noisy and the rotating mirror tends to become misaligned.

To provide better operation, electro-optic Q-switches have been made using liquids or solids which exhibit the Kerr effect. In order to build a Q-switch utilizing a Kerr cell, a linear polarizer and a Kerr cell are placed in the laser cavity and all of the reflecting surfaces are made stationary. The light emanating from the lasing element passes through the linear polarizer and is incident upon the Kerr cell. With a proper voltage applied thereto, the light exits from the Kerr cell with a plane of polarization which is rotated 45° with respect to the incident beam. The light is then reflected off the rear mirror and again passes through the Kerr cell where it is rotated by another 45°. When the light which is now rotated 90° reaches the polarizer, it will be rejected thereby preventing the laser cavity from oscillating. It is, therefore apparent that such a technique can be used to keep the laser off while the lasing element reaches the metastable state. At that time, the voltage can be removed from the Kerr cell permitting the laser to emit a high power, narrow width pulse.

Although it is theoretically possible to operate a Q-switch using a Kerr cell in the manner described above, it is substantially impossible to obtain Kerr effect materials which can be readily fabricated at economical prices and which can be provided with the required sizes. Crystals which exhibit the solid state Kerr effect, like KTN, are very difficult to obtain in the sizes necessary for a laser Q-switch.

Electro-optic Q-switches have also been made using crystals such as KDP and KD*P which exhibit the Pockels effect. Such crystals operate in substantially the same manner as described above with respect to the Kerr effect. However, with a Pockels effect crystal, the direction of light propagation must be along the crystal optic axis and, additionally, the electric field must be applied along the optic axis of the crystal. In order for this to be done, it is necessary to use transparent electrodes or some other suitable configuration, i.e. electrodes with holes in the middle so that the light can propagate in the direction of the optic axis without having to pass through the electrodes. It can be readily imagined that the construction of transparent electrodes or some other odd configuration with holes in the middle presents various problems which make operation in this mode rather undesirable.

To solve the problems associated with using electro-optic crystals in the Pockels effect mode, investigations have been made to find crystals in which light may be propagated along one axis with the electric field applied normal to this axis. Many crystals have been found which exhibit this effect. KDP and KD*P, for example, may be operated in what has been referred to as the dual transverse Pockels effect mode. In such a mode, if the electric field is applied in the direction of the optic axis of the crystal and if the direction of light propagation is along the 110 crystal axis, the electric field may be utilized to rotate the plane of polarization of the light and a Q-switch can be constructed in the manner described above with respect to the Kerr effect. However, operation in this mode has proven to be undesirable for several reasons. First of all, propagating the light along the crystal 110 axis gives rise to an effect due to the natural crystal birefringence. The birefringent effect tends to split the beam into at least two phases, one of which is retarded more than the other. Therefore, in order to operate in this mole, this effect must be compensated for. One way to compensate for this effect is to insert a second crystal in the laser cavity which is identical to the first crystal but which is rotated 90° about the axis of light propagation so that a reverse effect occurs in the second crystal thereby eliminating the splitting effect in the first. However, thermally induced birefringence also has a deleterious effect on the operation of the crystal which makes it necessary for the two crystals to be held at exactly the same temperature, a feat which is very difficult to achieve.

Another method of compensation is to use a fractional wave retardation plate to compensate for the splitting of the beam in the crystal. Although this will compensate for the birefringent effect, it cannot compensate for the thermally induced birefringent effect. Finally, KDP and KD*P are salts grown from water or heavy water solutions and are hygroscopic. As a result, the crystals behave very peculiarly in the presence of humidity and may even deteriorate into a pile of dust. In addition, if the crystal is not perfectly grown and if water molecules are trapped inside, the crystal deteriorates from the inside out so that hermetically sealing the crystal does not protect it from deterioration. Also, KDP and KD*P are very soft crystals which can be crumbled easily. As a result, although there are many techniques existing today for constructing Q-switches using either mechanical spoilers or electro-optical crystals, all of them have problems associated therewith and none have demonstrated an ability to produce a pulse with a width on the order of a few nanoseconds.

SUMMARY OF THE INVENTION

According to the present invention, there is provided a novel electro-optic Q-switch for a pulsed laser which eliminates all of the problems associated with the prior art Q-switches. The present Q-switch uses a single crystal of lithium niobate operating in the dual transverse Pockels mode. However, with lithium niobate, the direction of light propagation may be along the crystal optic axis with the electric field applied along the crystal A-axis. Since light propagating along the optic axis of a birefringent crystal is not affected by the natural crystal birefringence, no compensation is necessary and only one crystal is required. In addition, since the Curie point of lithium niobate is approximately 1230° C., the crystal is not temperature sensitive within normal ambient ranges. In addition, the crystal is not hygroscopic and is extremely hard. With all these features, the reliability of the system is greatly enhanced.

OBJECTS

It is, therefore, an object of the present invention to provide a novel electro-optic Q-switch for a pulsed laser.

It is a further object of the present invention to provide an electro-optic Q-switch for a pulsed laser which uses a single crystal of lithium niobate.

It is a still further object of the present invention to provide an electro-optic Q-switch for a pulsed laser which uses a single crystal of lithium niobate operating in the dual transverse Pockels mode.

It is another object of the present invention to provide an electro-optic Q-switch for a pulsed laser in which a single crystal of lithium niobate is located in the laser cavity with the direction of light propagation along the crystal optic axis and the electric field applied along the crystal A-axis.

Still other objects, features and attendant advantages of the present invention will become apparent to those skilled in the art from a reading of the following detailed description of a preferred embodiment constructed in accordance therewith, taken in conjunction with the accompanying drawing wherein:

DESCRIPTION OF THE PREFERRED EMBODIMENT

Figure 1:
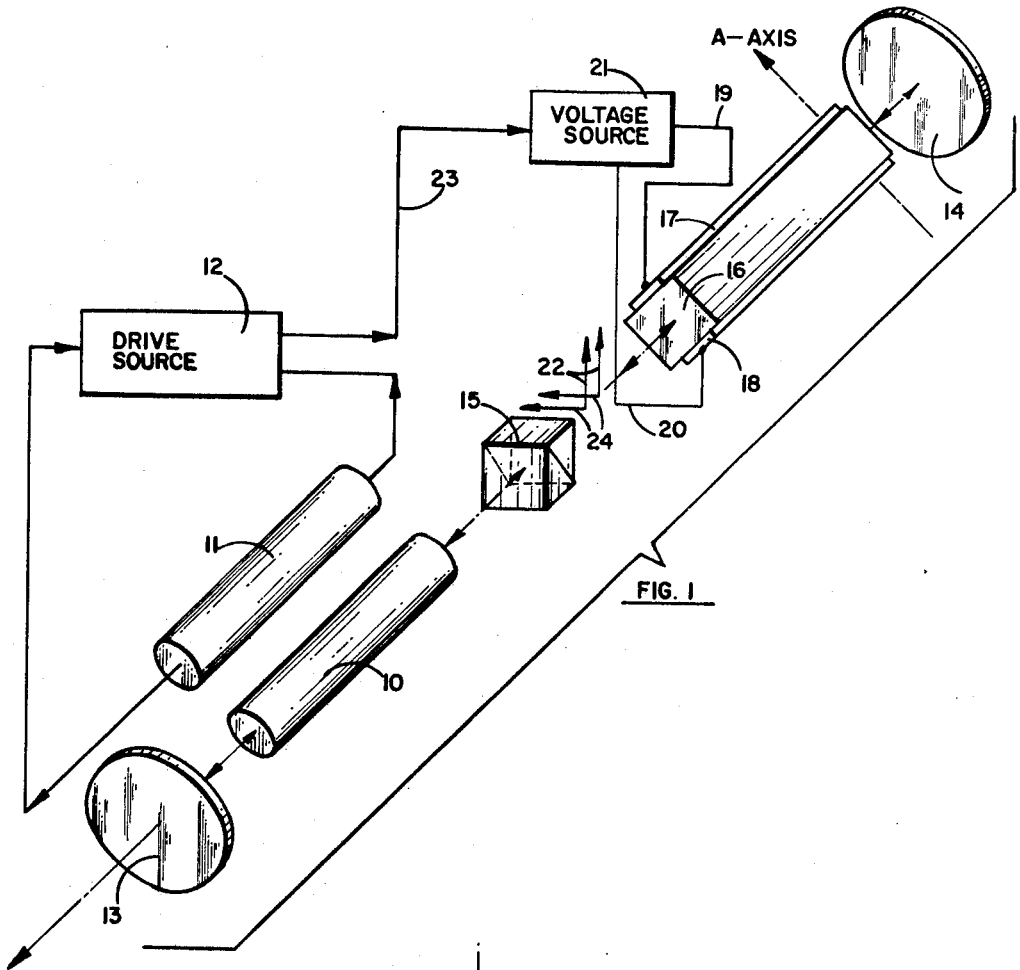
FIGURE 1 is a perspective view of a Q-switch for a pulsed laser in accordance with the present invention.

Referring now to the drawings and, more particularly, to FIGURE 1 thereof, there is shown a pulsed laser constructed in accordance with the teachings of the present invention. The pulsed laser consists of a lasing element 10 which may be ruby, neodymium in glass or calcium tungstate, an excitation source 11 which may most simply be a zenon flashlamp driven by a suitable drive source 12, a front reflector 13 which is partially transmitting to provide an output beam, and a rear reflector 14. The front and rear surfaces of lasing element 10 and the surfaces of reflectors 13 and 14 are optically aligned whereby light may be reflected back and forth between reflectors 13 and 14 through lasing element 10 to form an optical oscillator.

To operate the laser in a pulsed mode, excitation source 11 is pulsed by drive source 12 to energize lasing element 10. In the absence of any other apparatus in the laser cavity, lasing element 10 will oscillate for a period which may be in the millisecond region, thereby providing an output pulse of energy whose pulse width is equal to the period of oscillation of lasing element 10.

In order to narrow the output pulse and increase the peak amplitude thereof, there is added to the laser cavity a linear polarizer 15, which may be a polarizing crystal, and a crystal 16 which in the preferred embodiment is made of lithium niobate. Crystal 16 has a pair of electrodes 17 and 18 connected to opposite sides thereof. Electrodes 17 and 18 are connected by leads 19 and 20, respectively, to a suitable voltage source 21, which receives a synchronizing signal from drive source 12 via a lead 23 as will be explained more fully hereinafter. If linear polarizer 15 is arranged to polarize light in a direction shown by arrows 22, i.e. in the vertical direction, and if crystal 16 is made of lithium niobate, the A-axis of crystal 16 must be oriented at 45° to the plane of polarization as shown. In addition, electrodes 17 and 18 will be located perpendicular to the A-axis.

In operation, excitation source 11 is pulsed by drive source 12 to energize lasing element 10. At the same time, a synchronizing signal is fed from drive source 12 to voltage source 21 via lead 23. Voltage source 21 is energized to cause crystal 16 to rotate the polarization of the light incident thereon. If the proper voltage is applied to crystal 16 by voltage source 21, the light exits from crystal 16 with a plane of polarization which is rotated 45° with respect to the incident beam. The light is then reflected by rear reflector 14 and again passes through crystal 16 where it is again rotated by another 45°. Therefore, light exiting from crystal 16 will be oriented at a 90° angle with respect to the light originally incident thereon as shown by arrows 24. Since the light exiting from crystal 16 is polarized in a direction which is 90° out of phase with the plane of polarization of crystal 15, the light will be totally rejected by crystal 15 and the laser cavity will not oscillate.

Figure 2:
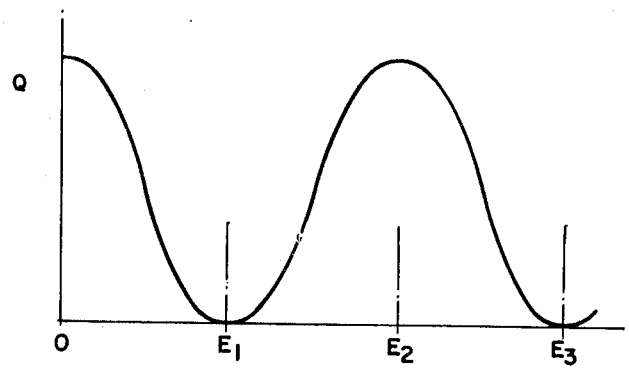
FIGURE 2 is a graph showing the Q of the cavity of the laser of FIGURE 1 as a function of the voltage applied to the crystal.

Referring briefly to FIGURE 2, there is shown a graph of the Q of the laser cavity as a function of the voltage applied to electrodes 17 and 18 by voltage source 21. From FIGURE 2 it can be seen that with no voltage applied to crystal 16, the Q of the cavity is a maximum. As the voltage is increased, the Q of the cavity decreases until the voltage reaches $E_1$ where the Q of the cavity is essentially zero. This corresponds to the point where the light exiting from crystal 16 is exactly 90° out of phase with respect to the light incident thereon. As the voltage E continues to increase, the Q of the cavity increases until at voltage $E_2$ the Q is again at a maximum value. This corresponds to the point where the light exiting from crystal 16 is in phase with the light incident thereon. The cycle then repeats, whereupon when $E=E_3$, the Q of the cavity is again substantially zero.

Returning now to FIGURE 1, when excitation source 11 is triggered, the voltage of source 21 is arranged to be either $E_1$ or $E_3$ or any other valve where the Q of the cavity is approximately zero so that the laser will not oscillate. After a predetermined period of time sufficient to permit lasting element 10 to reach the metastable state, at which time the maximum amount of energy is stored therein, the voltage E from source 21 is discharged to zero causing the cavity to immediately have a very high Q. As a result, the laser cavity begins to oscillate and lasing element 10 discharges its energy in a very short period of time thereby generating a pulse of extremely narrow width and high peak power.

It can be appreciated that the width of the pulse exiting from reflector 13 is a function of the speed with which voltage source 21 can switch the laser cavity from a condition of essentially zero Q to a condition of high Q. In other words, it would not be very desirable if the voltage E discharged from $E_1$ to 0 exponentially. If the voltage source 21 operates at $E_1$, it would be necessary to discharge voltage source 21 to ground very rapidly. However, the only way that this can be done practically is if a substantial amount of overshoot of the zero position is allowed. However, this is undesirable. Therefore, the most practical approach has been found to be to operate voltage source 21 with a voltage equal to $E_3$. Then, when voltage source 21 is discharged from $E_3$ to 0, two positions are passed through, at $E_2$ and 0, at which time the Q of the cavity is very high. However, it is possible to entirely discharge lasing element 10 at the time that E passes through $E_2$ so that the speed with which E returns to 0 is immaterial and any overshoot may be eliminated. In addition, by placing a variable resistance such as a potentiometer in the discharge circuitry associated with source 21, the time that it takes E to discharge through the voltage $E_2$ can be varied at will so as to vary the pulse width. In fact, it has been found that operation in this manner permits variation of the pulse width from as little as 5 nanoseconds to as much as 100 nanoseconds.

It can now be appreciated that in accordance with the present invention there is provided an electro-optic Q-switch which completely eliminates the problems existing with prior art devices. Since the light from lasing element 10 is propagating along the optic axis of crystal 16, there is no effect due to the natural crystal birefringence. As a result, no compensation is required and a single crystal may be used. In addition, since the Curie point of lithium niobate is approximately 1230° C. the crystal is not temperature sensitive. The crystal is unaffected by water or humidity and has superior mechanical properties than any other known crystal for use as an electro-optic Q-switch. Finally, the driving voltages are relatively low, $E_1$ being approximately 800 volts and $E_3$ being approximately 1700 volts. Other known cells require driving voltages which are at least as high as 5000 volts.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. In a pulsed laser including a lasing element, excitation source and a pair of reflectors defining a laser cavity, said lasing element adapted to emit, upon excitation by said excitation source, a relatively broad pulse of light, the improvement comprising means for decreasing the width and increasing the peak amplitude of said pulse of light, said means comprising an electro-optic crystal positioned in said laser cavity with the optic axis of said crystal parallel to the direction of light propagation in said laser cavity, and means for selectively applying an electric field to said crystal along an axis other than said optic axis.

2. In a pulsed laser according to claim 1, the improvement wherein said other axis is perpendicular to said optic axis.

3. In a pulsed laser according to claim 2, the improvement wherein said other axis is the A-axis of said crystal.

4. In a pulsed laser according to claim 1, the improvement comprising a polarizer positioned in said laser cavity and operative to linearly polarize the light emergent from said lasing element, said electro-optic crystal being adapted to rotate the plane of polarization of said linearly polarized light.

5. In a pulsed laser according to claim 4, the improvement wherein the amount of rotation of said plane of polarization is proportional to the magnitude of said applied electric field.

6. In a pulsed laser according to claim 5, the improvement wherein said other axis is perpendicular to said optic axis.

7. In a pulsed laser according to claim 6, the improvement wherein said other axis is the A-axis of said crystal.

8. In a pulsed laser according to claim 4 wherein there is further provided a drive source coupled to and adapted to pulse said excitation source, the improvement wherein said means for selectively applying an electric field to said crystal comprises a pair of electrodes operatively positioned on opposite sides of said crystal, and a voltage source operatively coupled to said electrodes to provide a voltage signal thereto, said drive source adapted to couple a synchronizing signal to said voltage source.

9. In a pulsed laser according to claim 8, the improvement wherein the amount of rotation of said plane of polarization is proportional to the magnitude of said voltage signal.

10. In a pulsed laser according to claim 8, the improvement wherein said electrodes are positioned substantially parallel to said direction of light propagation in said laser cavity.

11. In a pulsed laser according to claim 10, the improvement wherein said electrodes are positioned substantially perpendicular to the A-axis of said crystal.

12. In a pulsed laser according to claim 8, the improvement wherein said drive source is operative, upon pulsing said excitation source, to couple said synchronizing signal to said voltage source, said voltage source being operative, upon receiving said synchronizing signal, to couple said voltage signal to said electrodes for a predetermined period of time so as to rotate the plane of polarization of said linearly polarized light to prevent oscillation of said laser cavity and after said predetermined period of time, to remove said voltage signal to permit said lasing element to discharge the energy stored therein.

13. In a pulsed laser according to claim 12, the improvement wherein said predetermined period of time is sufficient to permit said lasing element to reach the metastable state.

14. In a pulsed laser according to claim 12, the improvement wherein the magnitude of said voltage signal is preselected to rotate said plane of polarization by approximately 45°.

15. In a pulsed laser according to claim 1 in which said electro-optic crystal consists of a single crystal.

16. In a pulsed laser according to claim 1 in which said electro-optic crystal consists of lithium niobate.

References Cited

UNITED STATES PATENTS

| 3,325,646 | 6/1967 | Reichel et al. | 350—157 XR |
| 3,402,002 | 9/1968 | Eden | 350—160 XR |

OTHER REFERENCES

Wentz: Novel Laser Q-Switching Mechanism, Proc. IRE, June 1964, pp. 716–717.

RODNEY D. BENNETT, JR., Primary Examiner

C. E. WANDS, Assistant Examiner

U.S. Cl. X.R.

350—150, 157